United States Patent
He et al.

(10) Patent No.: US 12,299,407 B2
(45) Date of Patent: May 13, 2025

(54) MODEL TRAINING METHOD, ELECTRONIC DEVICE, AND STORAGE MEDIUM

(71) Applicant: Beijing Baidu Netcom Science Technology Co., Ltd., Beijing (CN)

(72) Inventors: Huihui He, Beijing (CN); Leyi Wang, Beijing (CN); Duohao Qin, Beijing (CN); Minghao Liu, Beijing (CN)

(73) Assignee: BEIJING BAIDU NETCOM SCIENCE TECHNOLOGY CO., INC., Beijing (CN)

( * ) Notice: Subject to any disclaimer, the term of this patent is extended or adjusted under 35 U.S.C. 154(b) by 328 days.

(21) Appl. No.: 17/896,690

(22) Filed: Aug. 26, 2022

(65) Prior Publication Data

US 2023/0142217 A1   May 11, 2023

(30) Foreign Application Priority Data

Aug. 26, 2021 (CN) .......................... 202110991366.X

(51) Int. Cl.
*G06F 40/47* (2020.01)
*G06F 40/151* (2020.01)
(Continued)

(52) U.S. Cl.
CPC ............ *G06F 40/47* (2020.01); *G06F 40/151* (2020.01); *G06F 40/166* (2020.01); *G06F 40/295* (2020.01); *G06F 40/30* (2020.01)

(58) Field of Classification Search
CPC ...... G06F 40/47; G06F 40/151; G06F 40/166; G06F 40/295; G06F 40/30
(Continued)

(56) References Cited

U.S. PATENT DOCUMENTS

| 2013/0030787 A1* | 1/2013 | Cancedda ............... G06F 40/44 704/2 |
| 2022/0180056 A1* | 6/2022 | Hong ...................... G06F 9/547 |

FOREIGN PATENT DOCUMENTS

| CN | 103514230 A | 1/2014 |
| CN | 112541125 A | 3/2021 |
| CN | 112612892 A | 4/2021 |

OTHER PUBLICATIONS

First Search Report issued by the Chinese Patent Office for Chinese Patent Application No. 202110991366.X.
(Continued)

*Primary Examiner* — George C Monikang
(74) *Attorney, Agent, or Firm* — Moore & Van Allen PLLC

(57) ABSTRACT

The present disclosure provides a model training method and apparatus, an electronic device, and a storage medium, and relates to the field of artificial intelligence, in particular, to the field of natural language processing and deep learning. A specific implementation solution includes: constructing initial training corpora; performing data enhancement on the initial training corpora based on an algorithm contained in a target algorithm set to obtain target training corpora, wherein the target algorithm set is determined from multiple algorithm sets, and different algorithm sets are used for performing data enhancement on corpora with different granularity in the initial training corpora; and performing training on a language model based on the target training corpora to obtain a sequence labeling model, herein the language model is pre-trained based on text corpora.

19 Claims, 7 Drawing Sheets

---

Article 4 Contract Stage 4.1 Contract Amount 4.1.1 The annual network element leasing fee of the site of the contract is 32963.12 (including tax). The total leasing amount is 131852.52 yuan (the amount in words is: " one hundred thirty-one thousand eight hundred fifty-two and fifty-two hundredths yuan"). The total price including tax in 120965.61 yuan (the amount in words is: "one hundred twenty thousand nine hundred sixty-five and sixty-one hundredths yuan").

{
The total leasing amount: 131852.52 yuan.

The total leasing amount in words: "one hundred thirty-one thousand eight hundred fifty-two and fifty-two hundredths yuan".
}

(51) Int. Cl.
*G06F 40/166* (2020.01)
*G06F 40/295* (2020.01)
*G06F 40/30* (2020.01)

(58) Field of Classification Search
USPC .............................. 704/2, 5, 8, 9, 231, 251
See application file for complete search history.

(56) References Cited

OTHER PUBLICATIONS

The extend search report of the counterpart EP application No. 22192439.2 issued on Jan. 19, 2023.

\* cited by examiner

Fig. 1

Article 4 Contract Stage 4.1 Contract Amount 4.1.1 The annual network element leasing fee of the site of the contract is 32963.12 (including tax). The total leasing amount is 131852.52 yuan (the amount in words is: " one hundred thirty-one thousand eight hundred fifty-two and fifty-two hundredths yuan"). The total price including tax in 120965.61 yuan (the amount in words is: "one hundred twenty thousand nine hundred sixty-five and sixty-one hundredths yuan").

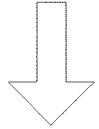

{
The total leasing amount: 131852.52 yuan.

The total leasing amount in words: "one hundred thirty-one thousand eight hundred fifty-two and fifty-two hundredths yuan".
}

Fig. 3
```
                              ┌─ Random shuffling algorithm    0.2
                  Sentence    ├─ Context algorithm             0.2
                  construction├─ Word replacement algorithm    0.3
                              └─ Entity replacement algorithm  0.3
Data enhancement in
sequence labeling  ┤          ┌─ Words transformation algorithm 0.2
task                Semantic  ├─ Word vector algorithm          0.4
                    similarity├─ Back translation algorithm     0.3
                              └─ Back translation algorithm     0.1
                  Keyword search                                1
```
Fig. 4
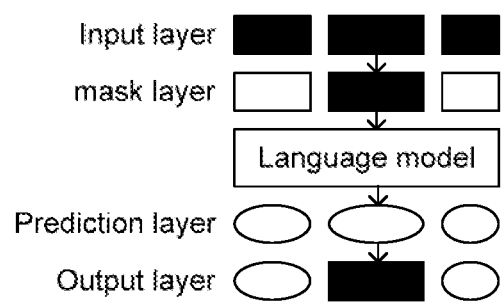
Fig. 5
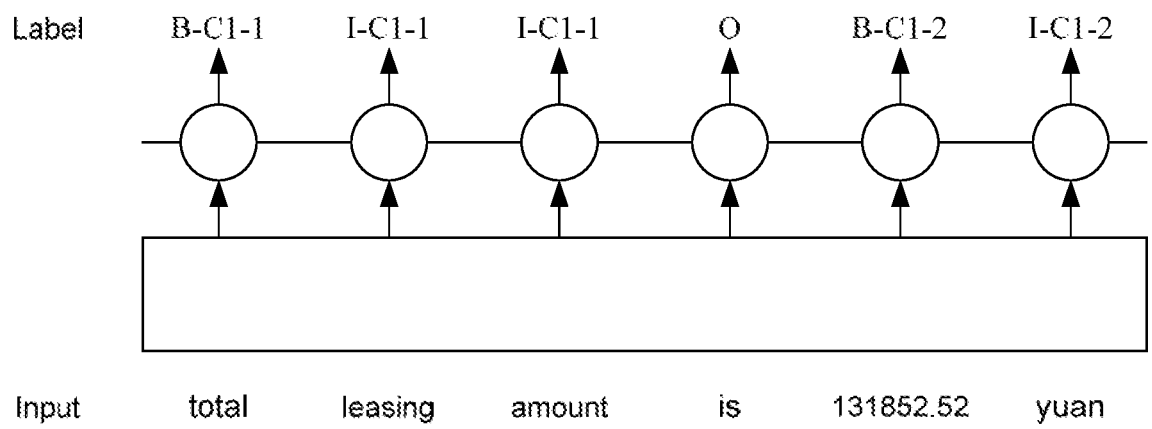

Fig. 7

Article 4 Contract Stage 4.1 Contract Amount 4.1.1 The annual network element leasing fee of the site of the contract is 32963.12 (including tax).
The total leasing amount is 131852.52 yuan (the amount in words is: "one hundred thirty-one thousand eight hundred fifty-two and fifty-two hundredths yuan"). The total price excluding tax is 120965.61 yuan (the amount in words is: "one hundred twenty thousand nine hundred sixty-five and sixty-one hundredths yuan").

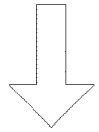

Article 4 Contract Stage 4.1 Contract Amount 4.1.1 The annual network element leasing fee of the site of the contract is 32963.12 (including tax).
User_class1-key is user_class1-answer (user_class2_key: user_class2-answer). The total price excluding tax is 120965.61 yuan (the amount in words is: "one hundred twenty thousand nine hundred sixty-five and sixty-one hundredths yuan").

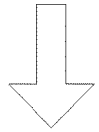

{

The total leasing amount: 131852.52 yuan.

The total leasing amount in words: "one hundred thirty-one thousand eight hundred fifty-two and fifty-two hundredths yuan".
}

MODEL TRAINING METHOD, ELECTRONIC DEVICE, AND STORAGE MEDIUM

CROSS-REFERENCE TO RELATED APPLICATIONS

The present disclosure claims priority to Chinese Patent Application No. 202110991366.X, filed on Aug. 26, 2021, and titled "Model Training Method and Apparatus, Electronic Device, and Storage Medium", the contents of which are hereby incorporated by reference in its entirety.

TECHNICAL FIELD

The present disclosure relates to the technical field of artificial intelligence, particularly to the field of natural language processing and deep learning, and specifically to a model training method, an electronic device, and a storage medium.

BACKGROUND OF THE INVENTION

Enterprises, such as banks, need to extract key information of contract documents into standard structured information. In order to realize automatic extraction of the key information of the contract documents, the automatic extraction can be performed based on a sequence labeling model. However, in an actual scenario, the number of contract documents with labels is small, and there is little training corpora for training the sequence labeling model, which leads to limited performance of the sequence labeling model.

SUMMARY OF THE INVENTION

The present disclosure provides a model training method, an electronic device, and a storage medium.

According to a first aspect of the present disclosure, a model training method is provided. The method may include that: initial training corpora may be constructed; data enhancement may be performed on the initial training corpora based on an algorithm contained in a target algorithm set to obtain target training corpora, wherein the target algorithm set is determined from multiple algorithm sets, and different algorithm sets are used for performing data enhancement on corpora with different granularity in the initial training corpora; and training may be performed on a language model based on the target training corpora to obtain a sequence labeling model, wherein the language model is pre-trained based on text corpora.

According to a second aspect of the present disclosure, a model training apparatus is provided. The apparatus may include: a corpus construction module, configured to construct initial training corpora; a data enhancement module, configured to perform data enhancement on the initial training corpora based on an algorithm contained in a target algorithm set to obtain target training corpora, wherein the target algorithm set is determined from multiple algorithm sets, and different algorithm sets are used for performing data enhancement on corpora with different granularity in the initial training corpora; and a model training module, configured to perform training on a language model based on the target training corpora to obtain a sequence labeling model, wherein the language model is pre-trained based on text corpora.

According to a third aspect of the present disclosure, an electronic device is provided. The electronic device may include: at least one processor; and a memory, in communication connection with the at least one processor. The memory may store an instruction executable by the at least one processor, and the instruction may be performed by the at least one processor, to cause the at least one processor to perform the model training method described in the first aspect.

According to a fourth aspect of the present disclosure, anon-transitory computer readable storage medium storing a computer instruction is provided. The computer instruction may be used for a computer to perform the model training method described in the first aspect.

According to a fifth aspect of the present disclosure, a computer program product is provided. The computer program product may include a computer program. The model training method described in the first aspect is implemented when the computer program is performed by a processor.

It is to be understood that the content described in this section is neither intended to identify the key or important features of the embodiments of the present disclosure, nor intended to limit the scope of the present disclosure. Other features of the present disclosure will become easy to understand through the following description.

BRIEF DESCRIPTION OF THE SEVERAL VIEWS OF THE DRAWINGS

Drawings are used for better understand the solution, and are not intended to limit the present disclosure.

FIG. 1 is a schematic diagram of extracting key information from a contract document according to the present disclosure.

FIG. 3 is a schematic diagram of a data enhancement method according to the present disclosure.

FIG. 4 is a schematic diagram of a model algorithm according to the present disclosure.

FIG. 5 is a schematic diagram of a sequence labeling model according to the present disclosure.

FIG. 7 is a schematic diagram of performing information extraction on a contract document based on the sequence labeling model according to the present disclosure.

DETAILED DESCRIPTION OF THE INVENTION

Figure 2:
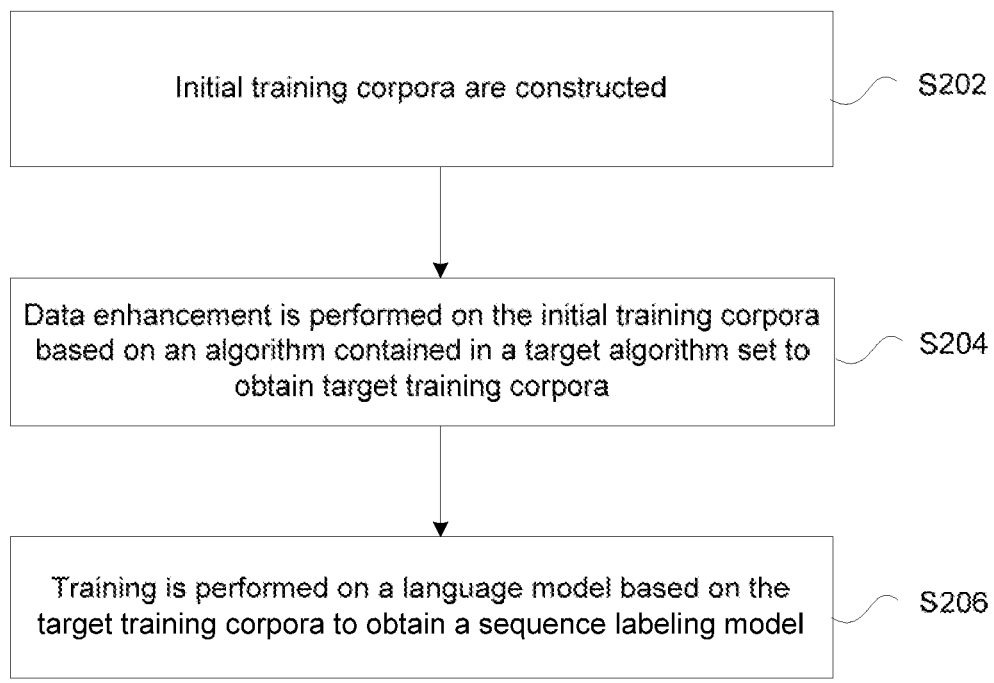
FIG. 2 is a flowchart of a model training method according to a first embodiment of the present disclosure.

Exemplary embodiments of the present disclosure are described in detail below with reference to the drawings, including various details of the embodiments of the present disclosure to facilitate understanding, and should be regarded as merely exemplary. Thus, those of ordinary skilled in the art shall understand that, variations and modifications can be made on the embodiments described herein, without departing from the scope and spirit of the present disclosure. Likewise, for clarity and conciseness, descriptions of well-known functions and structures are omitted in the following description.

First, technical nouns or technical terms in the embodiments of the present disclosure are explained as follows.

Entity: an object with a specific attribute set, which may be determined according to an information extraction task. For example, in a financial scenario, the entity may be leasing cost, leasing time, etc.

Back translation: a text of language A is translated into language B, and then translated into language A again.

Triple: it can be abstractly expressed as (s, p, o), wherein s and o represent two entities respectively, and p represents an association relationship between the two entities s and o.

In order to realize automatic extraction of key information from a contract document, the following solutions are provided in a related art.

Solution 1, a mode of manually extracting key information from a contract is adopted. However, there are diverse contract formats and there is much content, and the key information that needs to be extracted is distributed in different paragraphs. Therefore, for each contract, a certain number of manual entry personnel need to be trained to improve the extraction efficiency. However, the work of the solution is heavy, boring, time-consuming, and labor-intensive.

Solution 2, a contract document is matched to extract out key information through rules such as a regular expression or a predefined template based on a rule-based information extraction mode. For example, in the contract document, a value corresponding to a signing date always appears after the keyword "signing date:". However, the solution requires strict writing format of contract documents. When the writing formats of contract documents are diverse, a large number of rules need to be written, and the work of writing and maintaining rules is cumbersome.

Solution 3, an information extraction task is defined as a named entity recognition task based on an information extraction mode based on a sequence labeling model, and automatic extraction is performed by using the sequence labeling model. However, a certain amount of labeled data is needed for training model, and the performance of the model is limited in a small sample scenario.

The model training method provided by the embodiment of the present disclosure may be applied to text information extraction in small sample scenarios such as contract documents, legal documents, and literature materials. An execution subject of the method may be an electronic device used by a user (including a mobile terminal and a computer terminal), or a server (including a local server and a cloud server), but it is not limited to this.

In the embodiment of the present disclosure, detailed description is made by taking a scenario of extracting key information from a contract document as an example. As shown in FIG. 1, amount information (i.e., the information in a box in FIG. 1) in the contract document may be extracted to obtain a final information extraction result (as shown in the bottom of FIG. 1).

It is to be noted that the contract document in the present embodiment is not a contract document for a particular user and does not reflect personal information of a particular user.

According to the embodiment of the present disclosure, the present disclosure provides a model training method. FIG. 2 is a flowchart of a model training method according to a first embodiment of the present disclosure. As shown in FIG. 2, the flow includes the following steps.

At S202, initial training corpora are constructed.

In some embodiments, the initial training corpora may be constructed based on a text carrying a label. A specific processing process may be that: the text carrying the label is input and is segmented by taking a sentence as a unit. Since the text contains a large amount of content irrelevant to an extraction task and not all the content in the text is labeled, in order to reduce the noise in the initial training corpora, segment filtering may be performed first, and then further segmentation is performed through a morphological feature (such as a punctuation, a space, and a line break) to remove short segments to form the initial training corpora.

Description is made by taking the contract document as shown in FIG. 1 as an example. The sentence obtained by segmenting by taking a sentence as a unit is as follows: 4.1.1 The annual network element leasing fee of the site of the contract is 32963.12 (including tax), 4.1 Contract Amount, Article 4 Contract Stage, the total leasing amount is 131852.52 yuan (the amount in words is: "one hundred thirty-one thousand eight hundred fifty-two and fifty-two hundredths yuan"), the total price excluding tax is 120965.61 yuan (the amount in words is: "one hundred twenty thousand nine hundred sixty-five and sixty-one hundredths yuan"), etc. Then, segment filtering is performed, and filtered sentence is as follows: the total leasing amount is 131852.52 yuan (the amount in words is: "one hundred thirty-one thousand eight hundred fifty-two and fifty-two hundredths yuan"). Finally, segmentation is performed through the morphological feature, and the finally obtained initial training corpora include: the total leasing amount is 131852.52 yuan, and the amount in words is: "one hundred thirty-one thousand eight hundred fifty-two and fifty-two hundredths yuan".

At S204, data enhancement is performed on the initial training corpora based on an algorithm contained in a target algorithm set to obtain target training corpora, wherein the target algorithm set is determined from multiple algorithm sets, and different algorithm sets are used for performing data enhancement on corpora with different granularity in the initial training corpora.

At present, a data enhancement algorithm in the field of natural language processing usually focuses on a sentence-level classification task, for example, text classification. In the embodiment of the present disclosure, a text information extraction task is transformed into a sequence labeling task, which is essentially a token-level classification task. If an end-to-end sequence labeling model is adopted, the labeling granularity is at a word level, which leads to that a commonly used data enhancement algorithm is no longer applicable. Therefore, in a small sample scenario, the embodiment of the present disclosure may adopt a data enhancement strategy for a sequence labeling task.

Different data enhancement methods have different semantic loss degrees and different complexity of the trained model. In order to meet the requirement of data enhancement in different scenarios, multiple data enhancement strategies are provided in the embodiment of the present disclosure, and are further segmented into multiple algorithm sets based on the granularity of processing corpora. As shown in FIG. 3, in some embodiments, nine data enhancement methods may be adopted, and are segmented into three algorithm sets. Optionally, the corpora algorithm sets may include at least one of the following: a sentence construction algorithm set, a semantic similarity algorithm set, and a keyword retrieval algorithm set. The sentence construction algorithm set may perform data enhancement on the corpus at sentence granularity to generate at least one new sentence. The semantic similarity algorithm set may perform data enhancement on the corpus at word granularity. The keyword retrieval algorithm set may perform data enhancement on the corpus at entity granularity. Due to different granularity of corpora processed by different algorithm sets, the data volumes, the semantic loss degrees, and the complexity of different algorithm sets are different.

The sentence construction algorithm set is used for generating at least one new sentence based on at least one sentence in the initial training corpora. The algorithm does not rely on external resources and does not need to introduce additional labeling cost. Moreover, the algorithm has a high semantic loss degree and low complexity of the trained model.

Optionally, as shown in FIG. 3, in order to expand the data volume of the target training corpora and ensure that the target training corpora can cover more possibilities, the sentence construction algorithm set may further include at least one of the following four types: a random shuffling algorithm, a context algorithm, a character replacement algorithm, and an entity replacement algorithm.

The random shuffling algorithm is used for segmenting at least one first target sentence in the initial training corpora into multiple parts, and randomly sort the multiple parts to obtain the at least one new sentence, wherein the first target sentence may be segmented based on a morphological feature to obtain multiple segments.

The context algorithm is used for combining multiple successive sentences satisfying a preset window size in the initial training corpora to obtain the at least one new sentence. The preset window size may be set according to an actual scenario requirement. For example, when the preset window size is 3, a previous sentence of a current sentence, the current sentence, and the next sentence of the current sentence may be selected to form the at least one new sentence, so that the sequence labeling model can see more context across sentences and improve the performance of the sequence labeling model.

The character replacement algorithm is used for replacing at least one target character in at least one second target sentence in the initial training corpora with at least one replacement character with the same label to obtain the at least one new sentence. The at least one target character is determined based on a first preset probability. The first preset probability may be set according to the actual scenario requirement. For example, for the second target sentence "the total leasing amount is 131852.52 yuan", the characters "total", "is", "3", and "2" are selected according to the first preset probability by taking a character as the granularity, the characters are replaced by using characters with the same label, and the generated new sentence is "the full leasing amount was 191852.57 yuan".

The entity replacement algorithm is used for replacing at least one entity in at least one third target sentence in the initial training corpora with at least one replacement entity with the same label to obtain the at least one new sentence. For example, for the third target sentence "the total leasing amount is 131852.52 yuan", the entities "the total leasing amount, 131852.52 yuan" are selected by taking an entity as the granularity, and are replaced by selecting entities with the same label to generate the new sentence "the full leasing amount is 4783.0 yuan".

The semantic similarity algorithm set is for replacing at least one word in the initial training corpora, and a sentence where the at least one word after replacement is located has the same semantics as a sentence where the at least one word before replacement is located. The method relies on external resources, and the data volume of a target training sample can be improved by introducing additional labeling cost, so as to improve the performance of the sequence labeling model in the target task.

Optionally, as shown in FIG. 3, in order to expand the data volume of the target training corpora and ensure that the target training corpora can cover more possibilities, the semantic similarity algorithm set may further include at least one of the following four types: a word transformation algorithm, a word vector algorithm, a back translation algorithm, and a model algorithm.

The word transformation algorithm is used for replacing at least one first target word in the initial training corpora with at least one first replacement word with the same semantics and/or part of speech, wherein the at least one first target word is determined based on a second preset probability and the length of a sentence where the at least one first target word is located. The second preset probability may be set according to an actual scenario requirement, and is represented by p, and then the number of the words selected in the current sentence is n=p*len(sentence), wherein sentence represents the length of the current sentence, that is, more words are selected from a long text and less words are selected from a short text. In order to realize word transformation, word segmentation needs to be performed on the current sentence first. After the word segmentation, when a labeled entity is segmented, then the entity needs to be restored. In a process of selecting first target words, it is to be noted that selection of general words needs to be avoided.

It is to be noted that the abovementioned word transformation algorithm may be synonym transformation. For the at least one first target word, at least one synonym may be selected for replacing from a synonym table. Since the parts of speech of at least one synonym may be different, in order to reduce the semantic loss degree of the word transformation algorithm, the word transformation algorithm can be transformation of at least one synonym and at least one word with the same part of speech. For the at least one first target word, the at least one word with the same part of speech and the same semantics may be selected from a table of words with the same part of speech and a synonym table for replacing, that is, a first word set with the same part of speech may be selected from the table of the words with the same part of speech, and meanwhile, a second word set with the same semantics is selected from the synonym table, and then at least one same word contained in the first word set and the second word set are obtained to obtain the at least one first replacement word.

The word vector algorithm is used for determining at least one second replacement word corresponding to at least one second target word in the initial training corpora based on at least one word vector, and replacing the at least one second target word with the at least one second replacement word, wherein the semantics of the at least one second target word and the at least one second replacement word are the same. Similar to the word transformation algorithm, first, word segmentation needs to be performed on the current sentence. After the word segmentation, when a labeled entity is segmented, then the entity needs to be restored. In some embodiments, the word vector corresponding to the at least one second target word may be determined by a manner of querying a vector word table, then at least one vector word with the greatest similarity to the word vector in the vector word table is matched, so as to determine the at least one second replacement word. In other embodiments, a word vector processing model may be pre-trained. The at least one second target word is input into the model, and an output result of the model is the at least one second replacement word.

It is to be noted that a back translation-based data enhancement method is usually used in a sentence classification task. A specific solution is that an original sentence is translated into another language, and then is translated back to obtain a new sample. However, since the label in the sentence classification task is at a sentence level, while the label of the sequence labeling task is at a word level, when the method is applied to the sequence labeling task, a problem that the newly translated sentence cannot be labeled easily occurs. Optionally, in order to solve the abovementioned problem, in the embodiment of the present disclosure, the back translation algorithm is used for performing back translation processing on the labeled entity in the initial training corpora to obtain a back translated entity, and the labeled entity is replaced with the back translated entity. For example, in the sentence "Deng Ziqi sang the ending song named of never ever meet again", the labeled entities are "Deng Ziqi" and "never ever meet again". The sentence is segmented into "Deng Ziqi", "sang the ending song", and "never ever meet again", and back translation is performed on the segmented parts respectively to obtain a new sentence "Deng Ziqi sang the last song named of never to be seen again". The back translated entities become "Deng Ziqi" and "never to be seen again", and the sequence labeling label may be transformed according to the entities.

The model algorithm is used or replacing at least one third target word in the initial training corpora with at least one mask, processing a sentence where the at least one mask is located by using a language model to obtain at least one third replacement word corresponding to the at least one mask, and the at least one third target word is replaced with the at least one third replacement word. In some embodiments, after word segmentation and word selection are performed on the current sentence, the selected third target word may be replaced with [mask]. As shown in FIG. 4, a solid rectangular box represents the original word in the current sentence, a hollow rectangle represents that the third target word has been replaced with [mask], and then the current sentence is input into the language model for predicting. A hollow ellipse represents an output result of a prediction layer in the language model. An output layer in the language model may output the at least one third replacement word.

It is to be noted that, like a traditional sequence labeling task, an entity in the initial training corpora in the embodiment of the present disclosure has the problem of being segmented. For example, "the total leasing amount is 131852.52 yuan", wherein the entity "the total leasing amount" may be wrongly split into "the total leasing amount", that is, a word segmentation error. In order to solve the abovementioned problem, a solution provided in the related art is as follows: related entity labeling data is increased based on the entity that is wrongly segmented, but this will introduce additional labeling cost, and the benefit of the sequence labeling model is not significant. Optionally, in the embodiment of the present disclosure, the keyword retrieval algorithm set is configured to perform keyword search based on a target entity in the initial training corpora, and a searched result is directly taken as the target training corpora. Word segmentation processing is performed on the target entity to obtain at least two words (that is, the target entity will be segmented, and there is a word segmentation error), which optimizes the performance of the sequence labeling model on the target task by adding a related training corpora without introducing additional labeling cost.

Further, the keyword retrieval algorithm set is further used for processing the words after the word segmentation by using the sequence labeling model, and determining the at least one target entity based on an output result of the sequence labeling model. Therefore, the accuracy of determining the target entity may be improved by recognizing through the sequence labeling model.

It is to be noted that data enhancement is performed on the corpora with different granularity in the initial training corpora by using different algorithm sets, and the obtained target training corpora have different data volumes and semantic loss degrees, and the complexity of the trained sequence labeling models is also different. When the data enhancement is performed by simply using all algorithm sets, although the target training corpora with more data volume can be obtained, the target training corpora also contains more noise, resulting in an increase in the complexity of an information extraction process. Therefore, in the embodiment of the present disclosure, an appropriate data enhancement algorithm may be selected from multiple algorithm sets by fully considering the data volume that needs for the data enhancement, the acceptable semantic loss degree, and the complexity of the sequence labeling model according to the actual application scenario, so as to obtain the target algorithm set.

In the embodiment of the present disclosure, since the algorithm set often contains multiple data enhancement algorithms, in order to ensure that the target training corpora with a large data volume and less noise can be obtained, the probability of being selected may be set for the algorithm in each algorithm set in advance. For example, as shown in FIG. 3, the probabilities of the random shuffling algorithm, the context algorithm, the character replacement algorithm, and the entity replacement algorithm are respectively 0.2, 0.2, 0.3, and 0.3, and the probabilities of the word transformation algorithm, the word vector algorithm, the back translation algorithm, and the model algorithm are respectively 0.2, 0.4, 0.3, and 0.1.

At S206, training is performed on a language model based on the target training corpora to obtain a sequence labeling model, wherein the language model is pre-trained based on text corpora.

The language model in the abovementioned step may be a pre-trained language model and an open source model, which may be trained based on a large number of unsupervised text corpora and contain a large amount of prior semantic knowledge, so as to reduce the model training cost on the basis of ensuring the performance of the sequence labeling model.

An end-to-end sequence labeling model usually defines a label as "BIO-CLASS", wherein B, I and O represent a starting character of an entity, other characters of the entity, and an independent character. Taking a named entity recognition scenario as an example, an entity class is defined as a person name, a place name, or a organization name, and the number of the classes of the end-to-end recognition models is 7, for example, O, B-person name, I-person name, B-place name, I-place name, B-organization name, and I-organization name.

Optionally, each word in the target training corpora corresponds to three labels. A first label is used for representing the position of this word in the entity to which this word belongs, a second label is used for representing the class of the entity to which this word belongs, and the third label is used for representing the association relationship between the entity to which this word belongs and other entities.

The class of an entity may be the specific attribute of the entity set according to the actual application scenario. For example, in a financial application scenario, the class may be amount, time, person name, place name, etc., but it is not limited to this.

The association relationship between an entity and other entities may be whether the entity and other entities indicate the same object. For example, in a financial application scenario, the association relationship may be whether the entity is a name (such as leasing amount, leasing time, etc.) or a value (such as XXX yuan, XXX days, etc.) compared with other entities. When the entity is a name, the third label may be key; and when the entity is a value, the third label may be answer.

In the embodiment of the present disclosure, BIO may be defined as a first label, the entity class CLASS may be defined as a second label, and a third label EXTRACTION (key, answer) may be introduced. For example, the target training corpora is "the total leasing amount is 131852.52 yuan". The third label of the "total leasing amount" is "total leasing amount-key", and the third label of "131852.52 yuan" is the "total leasing amount-answer". Optionally, C1 may be used for representing the total leasing amount of the class, 1 represents key, and 2 represents answer. Combined with a BIO labeling system, the label corresponding to the first word "total" of an input sample is "B-C1-1", as shown in FIG. 5.

The information extraction task is transformed into a sequence labeling task in the field of machine learning by introducing a third label. Therefore, information extraction may be performed by using a joint extraction-based sequence labeling model. The model belongs to a joint decoding method of a unified entity and a relationship labeling framework.

Through the abovementioned steps, first the initial training corpora are constructed, and then the target algorithm set is determined from the multiple algorithm sets. Different algorithm sets are used for performing data enhancement on corpora with different granularity in the initial training corpora, and further perform data enhancement on the initial training corpora based on the algorithm contained in the target algorithm set to obtain the target training corpora. Finally, training is performed on the language model pre-trained based on the target training corpora to obtain the sequence annotation model. By fully considering the actual processing situation, an appropriate target algorithm set is selected to perform data enhancement, so as to obtain more labeling samples, improve the performance of the sequence labeling model, and realize the purpose of automatically extracting text information in a small sample scenario, thereby the problem that text information cannot be extracted automatically in small sample scenario is solved.

Optionally, in order to screen an appropriate target algorithm set from multiple algorithm sets, the method may further include any one of the following solutions.

Solution A, the target algorithm set is determined based on a first selection instruction. The first selection instruction is used for indicating to select the target algorithm set from the multiple algorithm sets. In some embodiments, multiple algorithm sets may be directly provided for a user and output in an interactive interface for the user to select. In order to facilitate determining an implementation solution of each algorithm set by the user, relevant descriptions may be provided for each algorithm set, so that the user may select one or more algorithm sets from the multiple algorithm sets according to a requirement. The user may select a target algorithm set through the operations of clicking, dragging and so on for multiple times to generate the first selection instruction, so that a device may directly take the algorithm set corresponding to the first selection instruction as the target algorithm set after receiving the first selection instruction. Then, the data enhancement is performed on the initial training corpora by using the target algorithm set to obtain target training corpora, and training is further performed by using the target training corpora, so as to achieve a purpose of training the sequence labeling model. By providing multiple algorithm sets to the user, it is ensured that the user can select the appropriate algorithm set according to the requirement.

Solution B, a target combination strategy is determined based on a second selection instruction, and an algorithm set corresponding to the target combination strategy is determined as the target algorithm set, wherein the second selection instruction is used for indicating to select the target combination strategy from multiple combination strategies, and different combination strategies corresponding to different algorithm sets. In some embodiments, a hierarchical combination strategy may be used for combining different levels of algorithm sets to obtain multiple combination strategies. Different combination strategies may be applied to scenarios with different complexity. For example, a combination strategy corresponding to a simple scenario only includes: the sentence construction algorithm set. A combination strategy corresponding to a relatively complex scenario includes: the sentence construction algorithm set and the semantic similarity algorithm set. A combination strategy corresponding to a complex scenario includes: the sentence construction algorithm set, the semantic similarity algorithm set, and the keyword retrieval algorithm set. In some embodiments, multiple combination strategies may be directly provided for the user. The user may select a combination strategy to generate the second selection instruction through an operation of clicking, so that the device may take the combination strategy corresponding to the second selection instruction as the target combination strategy after receiving the second selection instruction, take an algorithm set corresponding to the target combination strategy as the target algorithm set, then data enhancement is performed on the initial training corpora by using the target algorithm set to obtain target training corpora, and further perform training by using the target training corpora, so as to achieve the purpose of training the sequence labeling model. Different combination strategies are provided for different scenarios. The user does neither need to know what algorithms are specifically included in different combination strategies, nor known how to select different algorithms, but only needs to judge which scenario the current task belongs to.

Solution C, the target algorithm set is determined based on a semantic loss degree and/or data enhancement complexity. In some embodiments, a user may directly send the semantic loss degree required by the current task to a device, so that the device can select the appropriate algorithm set as the target algorithm set based on the received semantic loss degree. In other embodiments, a user may directly send the data enhancement complexity required by the current task to a device, so that the device can select the appropriate algorithm set as the target algorithm set based on the received data enhancement complexity. In yet other embodiments, a user may directly send the semantic loss degree and the data enhancement complexity required by the current task to a device, so that the device can select the appropriate algorithm set as the target algorithm set based on the received semantic loss degree and the data enhancement complexity. By directly inputting the semantic loss degree and/or the data enhancement complexity, it is ensured that the finally selected target algorithm set more confirms to the actual scenario.

Optionally, in order to achieve the purpose of key information extraction, the method further includes that: information extraction is performed on a target text based on the sequence labeling model, so as to obtain an information extraction result of the target text.

The target text in the abovementioned step may be the text that requires information extraction, and the type of the text is the same as the type of the initial training corpora, for example, both the text and the initial training corpora are contract documents.

In the embodiment of the present disclosure, for the target text, first the target text is segmented by taking a sentence as a unit, then is input into the sequence labeling model for processing to obtain a labeling result of each word, and then the labeling results are recombined and matched according to a preset processing rule, so as to obtain the information extraction result. Specifically, the words that belong to the same entity may be combined based on a first label and a second label, and then the entities with a key-answer relationship are matched based on a third label, so as to obtain a final information extraction result.

Figure 6:
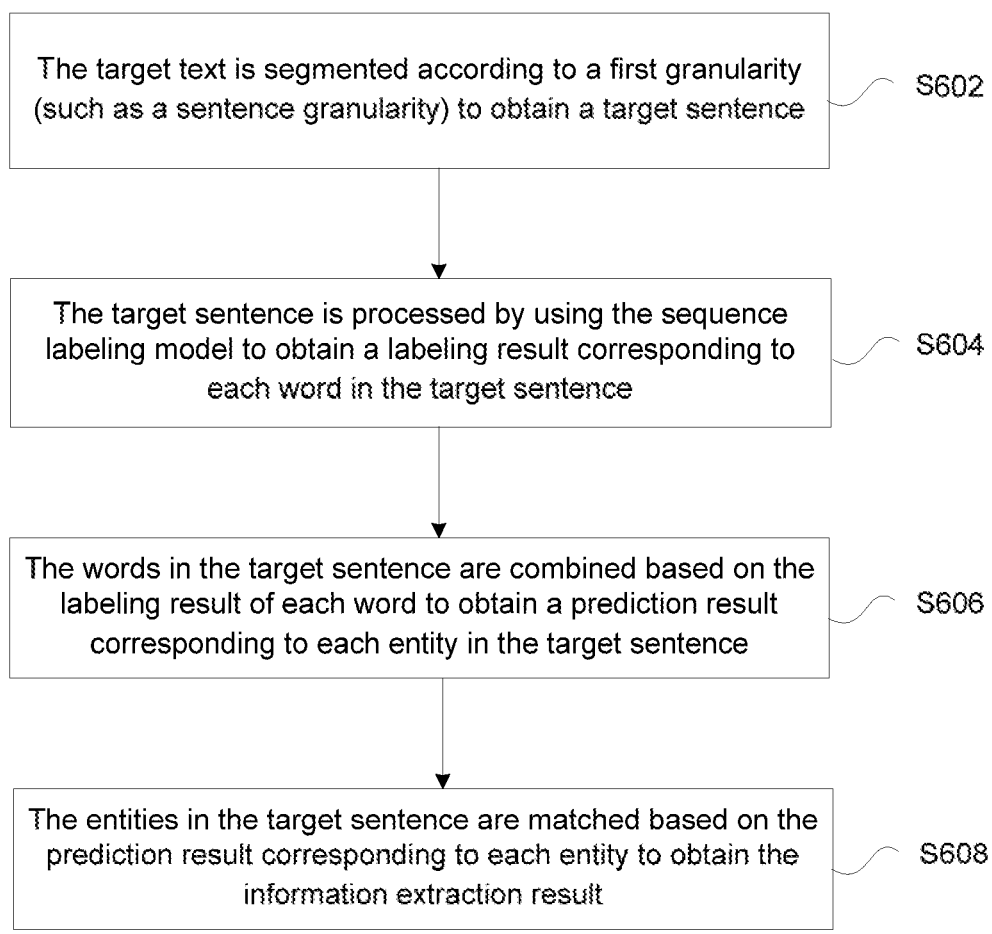
FIG. 6 is a flowchart of performing an information extraction method based on the sequence labeling model according to the present disclosure.

FIG. 6 is a flowchart of performing an information extraction method based on the sequence labeling model according to the present disclosure. As shown in FIG. 6, the flow includes the following steps.

At S602, the target text is segmented according to a first granularity (such as a sentence granularity) to obtain a target sentence.

At S604, the target sentence is processed by using the sequence labeling model to obtain a labeling result corresponding to each word in the target sentence. The labeling result includes three labels corresponding to the current word.

At S606, the words in the target sentence are combined based on the labeling result of each word to obtain a prediction result corresponding to each entity in the target sentence. The prediction result includes: a class of the entity and an association relationship between the entity and other entities.

At S608, the entities in the target sentence are matched based on the prediction result corresponding to each entity to obtain the information extraction result.

In the embodiment of the present disclosure, in an actual application stage, in order to realize automatic extraction of the target text, the target text may be segmented by taking a sentence as a unit, and the segmented target sentence is sent into the sequence labeling model to obtain a BIO-CLASS-EXTRACTION labeling result of each word. The labeling results are recombined by a BIO labeling system to obtain an entity-level prediction result CLASS-EXTRACTION in the sentence, and finally, key and value are matched in combination with a preset post-processing rule to obtain the final information extraction result. For example, as shown in FIG. 7, a contract document may be segmented by taking a sentence as a granularity, and the obtained target sentence is as shown in the box, which specifically includes: the total leasing amount is 131852.52 yuan, and the amount in words is: "one hundred thirty-one thousand eight hundred fifty-two and fifty-two hundredths yuan". After the target sentence is input into the sequence labeling model to obtain the label corresponding to each word, the entity-level prediction result in the sentence may be obtained by recombining according to a BIO labeling system, the prediction result of "the total leasing amount" is user_class1_key, the prediction result of "131852.52 yuan" is user_class1_answer, the prediction result of "the amount in words" is user_class2_key, and the prediction result of "one hundred thirty-one thousand eight hundred fifty-two and fifty-two hundredths yuan" is user_class2_answer, so that the final information extraction result is that the total leasing amount is 131852.52 yuan, and the total leasing amount in words is: "one hundred thirty-one thousand eight hundred fifty-two and fifty-two hundredths yuan".

Optionally, a method of matching the entities in the target sentence based on the prediction result corresponding to each entity to obtain the information extraction result includes: the number of triples in the target sentence is determined based on the prediction result corresponding to each entity, wherein two entities contained in the triple have the same class and conform to a preset association relationship. In response to the number of triples being one, the entities in the target sentence are combined to obtain the information extraction result. In response to the number of triples being more than one, the class corresponding to each triple is determined based on the classes of the entities contained in multiple triples, and the entities in the target sentence are combined based on the classes corresponding to the multiple triples to obtain the information extraction result.

The preset association relationship in the abovementioned step may refer to that two entities indicate the same object. For example, in a financial application scenario, in the two entities contained in the triple, one is name, and the other one is value. That is, the preset association relationship may refer to a key-value relationship. In addition, the classes of the two entities contained in the triple are the same; and therefore, the classes of the two entities may serve as the classes of the triple.

Further, the operation that the entities in the target sentence are combined based on the classes corresponding to the multiple triples to obtain the information extraction result includes: in response to the classes corresponding to the multiple triples being all different, the entities of the same class in the target sentence are combined to obtain the information extraction result. In response to the classes corresponding to the multiple triples being all the same, and the entities contained in different triples being all different, the entities that are closest to each other in the target sentence and conform to the preset association relationship are combined to obtain the information extraction result. In response to the classes corresponding to the multiple triples being all the same and different triples containing the same entities, the entities in the target sentence is supplemented based on the distance between the entities in the target sentence, and the entities after supplement are combined to obtain the information extraction result.

It is to be noted that when the classes corresponding to the multiple triples are not completely the same, for example, the class corresponding to part triples is a first class, and the class corresponding to the remaining triples is a second class, the multiple triples may be segmented into multiple triples sets according to the classes corresponding to the multiple triples, the classes corresponding to triples contained in the same triple set are the same, and the classes corresponding to triples contained in different triple sets are different; entities contained in each triple set are combined to obtain an extraction result corresponding to each triple set; and the extraction results corresponding to multiple triple sets are summarized to obtain the information extraction result. Further, the operation that the entities contained in each triple set are combined to obtain an extraction result corresponding to each triple set includes: in response to the entities contained in different triples in a triple set being all different, the entities that are closest to each other in the triple set and confirm to a pre-set association relationship are combined to obtain the information extraction result; and in response to different triples in a triple set containing the same entities, the entities in the target sentence are supplemented based on the distance between the entities in the target sentence, and the entities after supplement are combined to obtain the information extraction result.

In the embodiment of the present disclosure, in a simple extraction scenario, there is only one triple in one sentence. For example, sample 1: class1_key, class1_answer. Sample 2: class1_answer. In a scenario of sample 1, the entities may be directly combined into the triple. In a scenario of sample 2, the corresponding entity key information is missing, and at this time, filling may be performed by taking a predefined class name as a key.

In a scenario of a multi-entity relationship, one sentence contains multiple triples, that is, multiple key-value pairs. For example, sample 3: class1_key, class1_answer, class2_key, class2_answer. Sample 4: class1_key, class1_answer, class1_key, class1_answer. Sample 5: class1_key, class1_answer, class1_answer. In a scenario of sample 3, two relationships class1-key-value and class2-key-value exist at the same time. At this time, the entities are combined in pairs according to corresponding class information. In a scenario of sample 4, when the types of the relationships of the multiple triples contained in the sentence are the same, the entities may be combined into the triple in pairs by using a proximity principle, that is, the first two entities are combined, and the last two entities are combined. In a scenario of sample 5, when the types of the relationships of the multiple triples contained in the sentence are the same, and a certain entity exists in multiple relationships, class1-key closest to class1_answer may be selected to supplement by using a relationship overlapping principle.

In the embodiment of the present disclosure, for different scenarios, different processing rules are preset to ensure that the final information extraction result is obtained accurately.

In the embodiment of the present disclosure, the initial training corpora may be constructed by the following steps: a text carrying a label is acquired; the text carrying the label is segmented based on a second preset granularity to obtain a training sentence; the training sentence is filtered to obtain a filtered sentence; and the filtered sentence is processed to obtain the initial training corpora based on a morphological feature.

In the abovementioned step, the text carrying the label may be a manually labeled text, and in order to reduce the cost of manual labeling, the number of texts carrying the labels can be reduced to realize a small sample scenario.

In the embodiment of the present disclosure, the text carrying the label may be provided by a user, or a public text carrying a label is acquired from a network by a device. After the abovementioned text is acquired, the text is segmented by taking a sentence as a unit, so as to form the training sentence. Then, segment filtering is performed on the training sentence to filter away the segments that are irrelevant to a target task and do not contain a label. Finally, further segmenting is performed through the morphological feature (such as a punctuation, a space, and a line break) to remove short segment, so as to obtain the final initial training corpora. For example, for the filtered sentence "today, the total leasing amount is XXX yuan", "today" needs to be segmented, and only "the total leasing amount is XXX yuan" is remained. Through the abovementioned solution, the noise in the initial training corpora can be minimized and the performance of the sequence labeling model can be improved.

It is to be noted that the text carrying the label in the embodiment of the present disclosure comes from a public data set.

Figure 8:
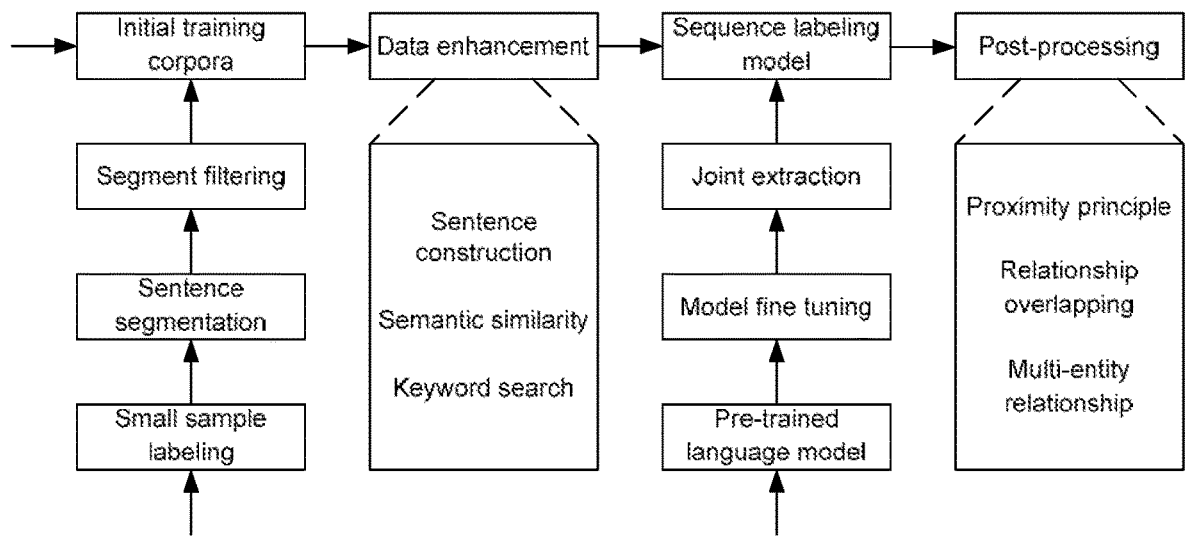
FIG. 8 is a flowchart of a model training method according to a second embodiment of the present disclosure.

FIG. 8 is a flowchart of a model training method according to a second embodiment of the present disclosure. Taking information extraction of a contract document as an example, as shown in FIG. 8, the flow includes: a contract document labeled with a small sample is input, and is segmented by taking a sentence as a unit, so as to form a training sentence. Then, segment filtering is performed to form initial training corpora. Data enhancement is performed by using a target algorithm set in multiple algorithm sets to obtain target training corpora. Here, the multiple algorithm sets includes: a sentence construction algorithm set, a semantic similarity algorithm set, and a keyword retrieval algorithm set. A pre-trained language model is finely tuning by the target training corpora, and a sequence labeling model is trained by a joint extraction method. In an actual application stage, a contract document to be extracted is segmented by taking sentence as a unit and is sent into the sequence labeling model to obtain a BIO-CLASS-EXTRACTION labeling result of each character. The labeling results are recombined by a BIO labeling system to obtain an entity-level prediction result CLASS-EXTRACTION in the sentence. Finally, a final information extraction result is obtained based on a post-processing rule. In a scenario of a multi-entity relationship, the post-processing rule here includes: a proximity principle, and relationship overlapping.

According to the embodiments of the present disclosure, the present disclosure further provides a model training apparatus. The model training apparatus is configured to implement the abovementioned embodiments and preferred implementation modes, and those have not been described will not be elaborated. As used below, the term "module" may implement a combination of software and/or hardware of a predetermined function. Although the apparatus described in the following embodiments is preferably implemented in software, hardware, or a combination of software and hardware, is also possible and contemplated.

Figure 9:
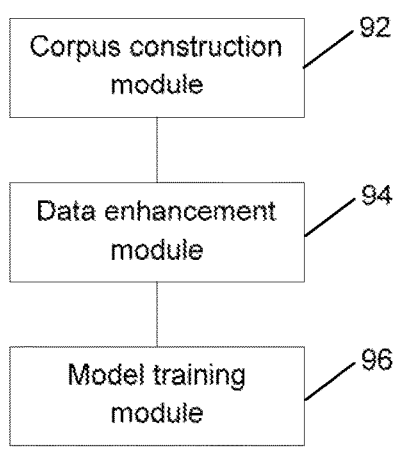
FIG. 9 is a schematic diagram of a model training apparatus according to the present disclosure.

FIG. 9 is a schematic diagram of a model training apparatus according to the present disclosure. As shown in FIG. 9, the apparatus includes: a corpus construction module 92, configured to construct initial training corpora; a data enhancement module 94, configured to perform data enhancement on the initial training corpora based on an algorithm contained in a target algorithm set to obtain target training corpora, wherein the target algorithm set is determined from multiple algorithm sets, and different algorithm sets are used for performing data enhancement on corpora with different granularity in the initial training corpora; and a model training module 96, configured to perform training on a language model based on the target training corpora to obtain a sequence labeling model, wherein the language model is pre-trained based on text corpora.

Optionally, the multiple algorithm sets include at least one of the following: a sentence construction algorithm set, used for generating at least one new sentence based on at least one sentence in the initial training corpora; a semantic similarity algorithm set, used for replacing at least one word in the initial training corpora, and a sentence where the at least one word after replacement is located has the same semantics as a sentence where the at least one word before replacement is located; and a keyword retrieval algorithm set, used for performing keyword search based on at least one target entity in the initial training corpora, wherein word segmentation processing is performed on the at least one target entity to obtain at least two words.

Optionally, the sentence construction algorithm set includes at least one of the following: a random shuffling algorithm, used for segmenting at least one first target sentence in the initial training corpora into multiple parts, and randomly sort the multiple parts to obtain the at least one new sentence; a context algorithm, used for combining multiple successive sentences satisfying a preset window size in the initial training corpora to obtain the at least one new sentence; a character replacement algorithm, used for replacing at least one target character in at least one second target sentence in the initial training corpora with at least one replacement character with the same label to obtain the at least one new sentence, wherein the at least one target character is determined based on a first preset probability; and an entity replacement algorithm, used for replacing at least one entity in at least one third target sentence in the initial training corpora with at least one replacement entity with the same label to obtain the at least one new sentence.

Optionally, the semantic similarity algorithm set includes at least one of the following: a word transformation algorithm, used for replacing at least one first target word in the initial training corpora with at least one first replacement word with the same semantics and/or part of speech, wherein the at least one first target word is determined based on a second preset probability and the length of a sentence where the at least one first target word is located; a word vector algorithm, used for determining at least one second replacement word corresponding to at least one second target word in the initial training corpora based on at least one word vector, and replacing the at least one second target word with the at least one second replacement word, wherein the semantics of the at least one second target word and the at least one second replacement word are the same; a back translation algorithm, used for performing back translation processing on at least one labeled entity in the initial training corpora to obtain at least one back translated entity, and replacing the at least one labeled entity with the at least one back translated entity; and a model algorithm, used for replacing at least one third target word in the initial training corpora with at least one mask, processing a sentence where the at least one mask is located by using a language model to obtain at least one third replacement word corresponding to the at least one mask, and replacing the at least one third target word with the at least one third replacement word.

Optionally, the keyword retrieval algorithm set is further used for processing the words after the word segmentation by using the sequence labeling model, and determining the at least one target entity based on an output result of the sequence labeling model.

Optionally, the apparatus further includes a set determination module, configured to one of the following steps: determining a target algorithm set based on a first selection instruction, wherein the first selection instruction is used for indicating to select the target algorithm set from the multiple algorithm sets; determining a target combination strategy based on a second selection instruction, and determining an algorithm set corresponding to the target combination strategy as the target algorithm set, wherein the second selection instruction is used for indicating to select the target combination strategy from multiple combination strategies, and different combination strategies corresponding to different algorithm sets; and determining the target algorithm set based on a semantic loss degree and/or data enhancement complexity.

Optionally, each word in the target training corpora corresponds to three labels. A first label is used for representing the position of this word in the entity to which this word belongs, a second label is used for representing the class of the entity to which this word belongs, and the third label is used for representing the association relationship between the entity to which this word belongs and other entities.

Optionally, the information extraction module includes: a segmenting unit, configured to segment a target text according to a first preset granularity to obtain a target sentence; a processing unit, configured to process the target sentence by using the sequence labeling model to obtain a labeling result corresponding to each word in the target sentence, wherein the labeling result includes three labels corresponding to the current word; a combination unit, configured to combine the words in the target sentence based on the labeling result of each word to obtain a prediction result corresponding to each entity in the target sentence, wherein the prediction result includes: the class of a corresponding entity, and the association relationship between the entity and other entities; and a matching unit, configured to match the entities in the target sentence based on the prediction result corresponding to each entity to obtain the information extraction result.

Optionally, the matching unit is further configured to determine the number of triples in the target sentence based on the prediction result corresponding to each entity, wherein two entities contained in the triple have the same class and conform to a preset association relationship. In response to the number of triples being one, the entities in the target sentence are combined to obtain the information extraction result. In response to the number of triples being more than one, the class corresponding to each triple is determined based on the classes of the entities contained in multiple triples, and the entities in the target sentence are combined based on the classes corresponding to the multiple triples to obtain the information extraction result.

Optionally, the matching unit is further configured to: combine, in response to the classes corresponding to the multiple triples being all different, the entities of the same class in the target sentence to obtain the information extraction result; combine, in response to the classes corresponding to the multiple triples being all the same and entities contained in different triples being all different, the entities that are closest to each other in the target sentence and conform to the preset association relationship to obtain the information extraction result; and supplement, in response to the classes corresponding to the multiple triples being all the same and different triples containing the same entities, the entities in the target sentence based on the distance between the entities in the target sentence, and combine the entities after supplement to obtain the information extraction result.

Optionally, the corpus construction module includes: a text acquisition unit, configured to acquire a text carrying a label; a text segmentation unit, configured to segment the text carrying the label according to a second preset granularity to obtain a training sentence; a sentence filtering unit, configured to filter the training sentence to obtain a filtered sentence; and a sentence processing unit, configured to process the filtered sentence to obtain the initial training corpora based on a morphological feature.

In the technical solution of the present disclosure, the involved acquisition, storage, and application of texts are in compliance with relevant laws and regulations, and do not violate public order and good customs.

According to the embodiments of the present disclosure, the present disclosure further provides an electronic device, a readable storage medium, and a computer program product.

Figure 10:
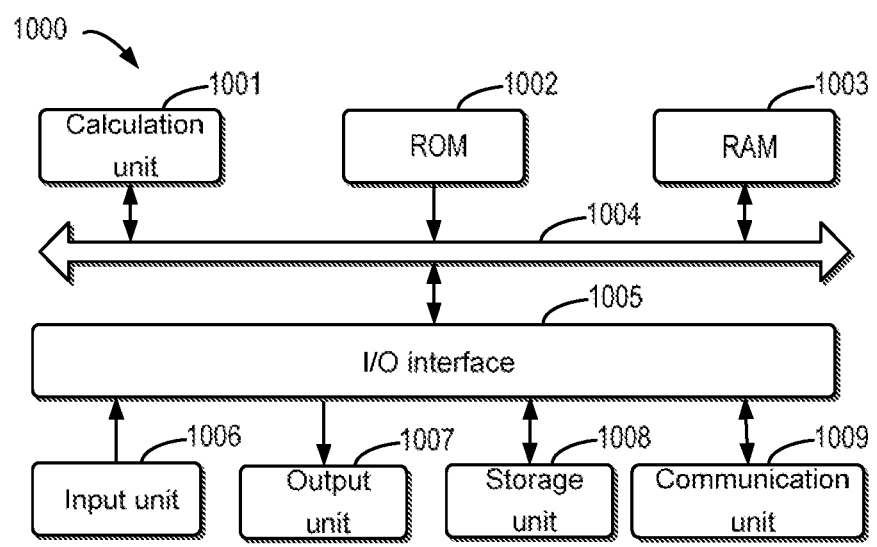
FIG. 10 is a block diagram of an electronic device configured to implement the model training method according to the embodiment of the present disclosure.

FIG. 10 illustrates a schematic block diagram of an example electronic device 1000 configured to implement an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, connections and relationships of the components, and functions of the components are merely examples, and are not intended to limit the implementation of the present disclosure described and/or required herein.

As shown in FIG. 10, the device 1000 includes a computing unit 1001. The computing unit may perform various appropriate actions and processing operations according to a computer program stored in a Read-Only Memory (ROM) 1002 or a computer program loaded from a storage unit 1008 into a Random Access Memory (RAM) 1003. In the RAM 1003, various programs and data required for the operation of the device 1000 may also be stored. The computing unit 1001, the ROM 1002, and the RAM 1003 are connected to each other by using a bus 1004. An Input/Output (I/O) interface 1005 is also connected to the bus 1004.

Multiple components in the device 1000 are connected to the I/O interface 1005, and include: an input unit 1006, such as a keyboard and a mouse; an output unit 1007, such as various types of displays and loudspeakers; the storage unit 1008, such as a disk and an optical disc; and a communication unit 1009, such as a network card, a modem, and a wireless communication transceiver. The communication unit 1009 allows the device 1000 to exchange information/data with other devices through a computer network, such as the Internet, and/or various telecommunication networks.

The computing unit 1001 may be various general and/or special processing assemblies with processing and computing capabilities. Some examples of the computing unit 1001 include, but are not limited to, a Central Processing Unit (CPU), a Graphics Processing Unit (GPU), various dedicated Artificial Intelligence (AI) computing chips, various computing units for running machine learning model algorithms, a Digital Signal Processor (DSP), and any appropriate processors, controllers, microcontrollers, etc. The computing unit 1001 performs the various methods and processing operations described above, for example, the model training method. For example, in some embodiments, the model training method may be implemented as a computer software program, which is tangibly included in a machine-readable medium, such as the storage unit 1008. In some embodiments, part or all of the computer programs may be loaded and/or installed on the device 1000 via the ROM 1002 and/or the communication unit 1009. When the computer program is loaded into the RAM 1003 and performed by the computing unit 1001, one or more steps of the clustering method for spatial points described above may be performed. Alternatively, in other embodiments, the computing unit 1001 may be configured to perform the model training method in any other suitable manners (for example, by means of firmware).

The various implementation modes of systems and technologies described herein may be implemented in a digital electronic circuit system, an integrated circuit system, a Field Programmable Gate Array (FPGA), an Application-Specific Integrated Circuit (ASIC), an Application-Specific Standard Product (ASSP), a System-On-Chip (SOC), a Complex Programmable Logic Device (CPLD), computer hardware, firmware, software, and/or a combination thereof. These various implementation modes may include: being implemented in one or more computer programs, the one or more computer programs may be performed and/or interpreted on a programmable system including at least one programmable processor. The programmable processor may be a dedicated or general programmable processor, which can receive data and instructions from a storage system, at least one input device, and at least one output device, and transmit the data and instructions to the storage system, the at least one input device, and the at least one output device.

Program codes used for implementing the method of the present disclosure can be written in any combination of one or more programming languages. These program codes can be provided to the processors or controllers of general computers, special computers, or other programmable data processing devices, so that, when the program codes are performed by the processors or controllers, functions/operations specified in the flowcharts and/or block diagrams are implemented. The program codes can be performed entirely on a machine, partially performed on the machine, and partially performed on the machine and partially performed on a remote machine as an independent software package, or entirely performed on the remote machine or a server.

In the context of the present disclosure, a machine-readable medium may be a tangible medium, which may include or store a program for being used by an instruction execution system, device, or apparatus or in combination with the instruction execution system, device, or apparatus. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any foregoing suitable combinations. More specific examples of the machine-readable storage medium may include electrical connections based on one or more wires, a portable computer disk, a hard disk, a RAM, a ROM, an Erasable Programmable Read-Only Memory (EPROM or flash memory), an optical fiber, a portable Compact Disk Read-Only Memory (CD-ROM), an optical storage device, a magnetic storage device, or any above suitable combinations.

In order to provide interaction with a user, the system and technologies described herein can be implemented on a computer, including a display device for displaying information to the user (for example, a Cathode Ray Tube (CRT) or a Liquid Crystal Display (LCD) monitor), a keyboard and a pointing device (for example, a mouse or a trackball). The user can provide an input to the computer by using the keyboard and the pointing device. Other types of devices may also be configured to provide interaction with the user, for example, the feedback provided to the user may be any form of sensory feedback (such as visual feedback, auditory feedback, or tactile feedback), and may be the input from the user received in any form (including acoustic input, voice input, or tactile input).

The system and technologies described herein may be implemented in a computing system (for example, as a data server) including a back-end component, or a computing system (for example, an application server) including a middleware component, or a computing system (for example, a user computer with a graphical user interface or network browser, the user may be in interaction with implementations of the system and technologies described herein by using the graphical user interface or network browser) including a front-end component, or a computing system including any combination of the back-end component, the middleware component, or the front-end component. The components of the system can be connected to each other through any form or digital data communication (for example, a communication network) of the medium. Examples of the communication network include a Local Area Network (LAN), a Wide Area Network (WAN), and the Internet.

The computer system may include a client and a server. The client and the server are generally far away from each other and usually interact by means of the communication network. A relationship between the client and the server is generated by the computer program that is run on the corresponding computer and has a client-server relationship with each other. The server may be a cloud server, and may also be a distributed system server, or a server combined with a blockchain.

It is to be understood that, the steps may be reordered, added or deleted by using various forms of programs shown above. For example, the steps described in the present disclosure may be performed in parallel, sequentially, or in a different order, as long as desired results of the technical solutions disclosed in the present disclosure can be achieved, which are not limited herein.

The foregoing specific implementation modes do not constitute limitations on the scope of protection of the present disclosure. Those skilled in the art should understand that, various modifications, combinations, sub-combinations, and substitutions can be made according to design requirements and other factors. Any modifications, equivalent replacements, improvements and the like made within the spirit and principle of the present disclosure shall fall within the scope of protection of the present disclosure.

What is claimed is:

1. A model training method, comprising:
constructing initial training corpora;
performing data enhancement on the initial training corpora based on an algorithm contained in a target algorithm set to obtain target training corpora, wherein the target algorithm set is determined from a plurality of algorithm sets, and different algorithm sets are used for performing data enhancement on corpora with different granularity in the initial training corpora, wherein each word in the target training corpora corresponds to three labels, wherein a first label is used for representing the position of this word in the entity to which this word belongs, a second label is used for representing the class of the entity to which this word belongs, and the third label is used for representing the association relationship between the entity to which this word belongs and other entities; and
performing training on a language model based on the target training corpora to obtain a sequence labeling model, wherein the language model is pre-trained based on text corpora.

2. The method as claimed in claim 1, wherein the plurality of algorithm sets comprise:
a sentence construction algorithm set, used for generating at least one new sentence based on at least one sentence in the initial training corpora.

3. The method as claimed in claim 1, wherein the plurality of algorithm sets comprise:
a semantic similarity algorithm set, used for replacing at least one word in the initial training corpora, and a sentence where the at least one word after replacement is located has the same semantics as a sentence where the at least one word before replacement is located.

4. The method as claimed in claim 1, wherein the plurality of algorithm sets comprise:
a keyword retrieval algorithm set, used for performing keyword search based on at least one target entity in the initial training corpora, wherein word segmentation processing is performed on the at least one target entity to obtain at least two words.

5. The method as claimed in claim 2, wherein the sentence construction algorithm set comprises:
a random shuffling algorithm, used for segmenting at least one first target sentence in the initial training corpora into a plurality of parts, and randomly sort the plurality of parts to obtain the at least one new sentence;
a context algorithm, used for combining a plurality of successive sentences satisfying a preset window size in the initial training corpora to obtain the at least one new sentence;
a character replacement algorithm, used for replacing at least one target character in at least one second target sentence in the initial training corpora with at least one replacement character with the same label to obtain the at least one new sentence, wherein the at least one target character is determined based on a first preset probability; and
an entity replacement algorithm, used for replacing at least one entity in at least one third target sentence in the initial training corpora with at least one replacement entity with the same label to obtain the at least one new sentence.

6. The method as claimed in claim 3, wherein the semantic similarity algorithm set comprises:
a word transformation algorithm, used for replacing at least one first target word in the initial training corpora with at least one first replacement word with the same semantics, wherein the at least one first target word is determined based on a second preset probability and the length of a sentence where the at least one first target word is located;
a word vector algorithm, used for determining at least one second replacement word corresponding to at least one second target word in the initial training corpora based on at least one word vector, and replacing the at least one second target word with the at least one second replacement word, wherein the semantics of the at least one second target word and the at least one second replacement word are the same;
a back translation algorithm, used for performing back translation processing on at least one labeled entity in the initial training corpora to obtain at least one back translated entity, and replacing the at least one labeled entity with the at least one back translated entity; and
a model algorithm, used for replacing at least one third target word in the initial training corpora with at least one mask, processing a sentence where the at least one mask is located by using a language model to obtain at least one third replacement word corresponding to the at least one mask, and replacing the at least one third target word with the at least one third replacement word.

7. The method as claimed in claim 3, wherein the semantic similarity algorithm set comprises:
   a word transformation algorithm, used for replacing at least one first target word in the initial training corpora with at least one first replacement word with the part of speech, wherein the at least one first target word is determined based on a second preset probability and the length of a sentence where the at least one first target word is located;
   a word vector algorithm, used for determining at least one second replacement word corresponding to at least one second target word in the initial training corpora based on at least one word vector, and replacing the at least one second target word with the at least one second replacement word, wherein the semantics of the at least one second target word and the at least one second replacement word are the same;
   a back translation algorithm, used for performing back translation processing on at least one labeled entity in the initial training corpora to obtain at least one back translated entity, and replacing the at least one labeled entity with the at least one back translated entity; and
   a model algorithm, used for replacing at least one third target word in the initial training corpora with at least one mask, processing a sentence where the at least one mask is located by using a language model to obtain at least one third replacement word corresponding to the at least one mask, and replacing the at least one third target word with the at least one third replacement word.

8. The method as claimed in claim 3, wherein the semantic similarity algorithm set comprises:
   a word transformation algorithm, used for replacing at least one first target word in the initial training corpora with at least one first replacement word with the same semantics and part of speech, wherein the at least one first target word is determined based on a second preset probability and the length of a sentence where the at least one first target word is located;
   a word vector algorithm, used for determining at least one second replacement word corresponding to at least one second target word in the initial training corpora based on at least one word vector, and replacing the at least one second target word with the at least one second replacement word, wherein the semantics of the at least one second target word and the at least one second replacement word are the same;
   a back translation algorithm, used for performing back translation processing on at least one labeled entity in the initial training corpora to obtain at least one back translated entity, and replacing the at least one labeled entity with the at least one back translated entity; and
   a model algorithm, used for replacing at least one third target word in the initial training corpora with at least one mask, processing a sentence where the at least one mask is located by using a language model to obtain at least one third replacement word corresponding to the at least one mask, and replacing the at least one third target word with the at least one third replacement word.

9. The method as claimed in claim 4, wherein the keyword retrieval algorithm set is further used for processing the words after the word segmentation processing by using the sequence labeling model, and determining the at least one target entity based on an output result of the sequence labeling model.

10. The method as claimed in claim 1, further comprising one of the following:
    determining the target algorithm set based on a first selection instruction, wherein the first selection instruction is used for indicating to select the target algorithm set from the plurality of algorithm sets;
    determining a target combination strategy based on a second selection instruction, and determining an algorithm set corresponding to the target combination strategy as the target algorithm set, wherein the second selection instruction is used for indicating to select the target combination strategy from a plurality of combination strategies, and different combination strategies corresponding to different algorithm sets; and
    determining the target algorithm set based on a semantic loss degree.

11. The method as claimed in claim 1, further comprising one of the following:
    determining the target algorithm set based on a first selection instruction, wherein the first selection instruction is used for indicating to select the target algorithm set from the plurality of algorithm sets;
    determining a target combination strategy based on a second selection instruction, and determining an algorithm set corresponding to the target combination strategy as the target algorithm set, wherein the second selection instruction is used for indicating to select the target combination strategy from a plurality of combination strategies, and different combination strategies corresponding to different algorithm sets; and
    determining the target algorithm set based on a data enhancement complexity.

12. The method as claimed in claim 1, further comprising one of the following:
    determining the target algorithm set based on a first selection instruction, wherein the first selection instruction is used for indicating to select the target algorithm set from the plurality of algorithm sets;
    determining a target combination strategy based on a second selection instruction, and determining an algorithm set corresponding to the target combination strategy as the target algorithm set, wherein the second selection instruction is used for indicating to select the target combination strategy from a plurality of combination strategies, and different combination strategies corresponding to different algorithm sets; and
    determining the target algorithm set based on a semantic loss degree and data enhancement complexity.

13. The method as claimed in claim 1, further comprising:
    performing information extraction on a target text based on the sequence labeling model to obtain an information extraction result of the target text.

14. The method as claimed in claim 13, wherein the performing information extraction on a target text based on the sequence labeling model to obtain an information extraction result of the target text comprises:
    segmenting the target text according to a first preset granularity to obtain a target sentence;
    processing the target sentence by using the sequence labeling model to obtain a labeling result corresponding to each word in the target sentence, wherein the labeling result comprises three labels of the corresponding word;
    combining the words in the target sentence based on the labeling result of each word to obtain a prediction result corresponding to each entity in the target sentence, wherein the prediction result comprises: the class of the corresponding entity, and the association relationship between the entity and other entities; and matching the entity in the target sentence based on the prediction result corresponding to each entity to obtain the information extraction result.

15. The method as claimed in claim 14, wherein the matching the entity in the target sentence based on the prediction result corresponding to each entity to obtain the information extraction result comprises:

determining the number of triples in the target sentence based on the prediction result corresponding to each entity, wherein two entities contained in the triple have the same class and conform to a preset association relationship;

in response to the number of triples being one, combining the entities in the target sentence to obtain the information extraction result; and in response to the number of triples being more than one, determining the class corresponding to each triple based on the classes of the entities contained in each triple, and combining the entities in the target sentence based on the classes corresponding to a plurality of triples to obtain the information extraction result.

16. The method as claimed in claim 15, wherein the combining the entities in the target sentence based on the classes corresponding to a plurality of triples to obtain the information extraction result comprises:

in response to the classes corresponding to the plurality of triples being all different, combining the entities of the same class in the target sentence to obtain the information extraction result;

in response to the classes corresponding to the plurality of triples being all the same and entities contained in different triples being all different, combining the entities that are closest to each other in the target sentence and conform to the preset association relationship to obtain the information extraction result; and in response to the classes corresponding to the plurality of triples being all the same and different triples containing the same entities, supplementing the entities in the target sentence based on the distance between the entities in the target sentence, and combining the entities after supplement to obtain the information extraction result.

17. The method as claimed in claim 1, wherein the constructing the initial training corpora comprises:

acquiring a text carrying a label;

segmenting the text carrying the label according to a second preset granularity to obtain a training sentence;

filtering the training sentence to obtain a filtered sentence; and processing the filtered sentence based on a morphological feature to obtain the initial training corpora.

18. An electronic device, comprising:

at least one processor; and a memory, in communication connection with the at least one processor, wherein the memory stores an instruction executable by the at least one processor, and the instruction is performed by the at least one processor, to cause the at least one processor to perform the model training method:

constructing initial training corpora;

performing data enhancement on the initial training corpora based on an algorithm contained in a target algorithm set to obtain target training corpora, wherein the target algorithm set is determined from a plurality of algorithm sets, and different algorithm sets are used for performing data enhancement on corpora with different granularity in the initial training corpora, wherein each word in the target training corpora corresponds to three labels, wherein a first label is used for representing the position of this word in the entity to which this word belongs, a second label is used for representing the class of the entity to which this word belongs, and the third label is used for representing the association relationship between the entity to which this word belongs and other entities; and performing training on a language model based on the target training corpora to obtain a sequence labeling model, wherein the language model is pre-trained based on text corpora.

19. A non-transitory computer readable storage medium, storing a computer instruction, wherein the computer instruction is used for a computer to perform the model training method:

constructing initial training corpora;

performing data enhancement on the initial training corpora based on an algorithm contained in a target algorithm set to obtain target training corpora, wherein the target algorithm set is determined from a plurality of algorithm sets, and different algorithm sets are used for performing data enhancement on corpora with different granularity in the initial training corpora, wherein each word in the target training corpora corresponds to three labels, wherein a first label is used for representing the position of this word in the entity to which this word belongs, a second label is used for representing the class of the entity to which this word belongs, and the third label is used for representing the association relationship between the entity to which this word belongs and other entities; and performing training on a language model based on the target training corpora to obtain a sequence labeling model, wherein the language model is pre-trained based on text corpora.

* * * * *